United States Patent [19]

MacCarthy

[11] Patent Number: 4,762,380

[45] Date of Patent: Aug. 9, 1988

[54] INTERACTIVE KALEIDOSCOPE

[76] Inventor: Patrick MacCarthy, 5263 Arbutus St., Arvada, Colo. 80002

[21] Appl. No.: 875,448

[22] Filed: Jun. 17, 1986

[51] Int. Cl.$^4$ .............................................. G02B 23/00
[52] U.S. Cl. ...................................................... 350/4.1
[58] Field of Search ................................. 350/4.1, 4.2

[56] References Cited

U.S. PATENT DOCUMENTS

| | | | |
|---|---|---|---|
| 66,134 | 6/1867 | Earnshaw | 350/4.1 |
| 147,480 | 2/1874 | Collicott | 350/4.1 |
| 407,937 | 7/1889 | Lovibond | 350/4.1 |
| 631,550 | 8/1899 | Wale | 350/4.1 |
| 1,697,382 | 1/1929 | Burkard | 350/4.1 |
| 1,706,998 | 3/1929 | Dawson et al. | 350/4.1 |
| 2,583,676 | 1/1952 | Wendel | 350/4.1 |
| 2,697,380 | 12/1954 | Wyser | 350/4.1 X |
| 3,020,796 | 2/1962 | Kaplan | 350/4.1 |
| 3,809,879 | 5/1974 | Gonzalez | 350/4.1 X |

*Primary Examiner*—Richard A. Wintercorn
*Attorney, Agent, or Firm*—Oblon, Fisher, Spivak, McClelland & Maier

[57] ABSTRACT

A kaleidoscope composed of two or more mirrors housed within a tubular container, an eye-piece at one end of the tubular container for viewing the kaleidoscopic design, and a translucent or transparent screen located at the end of tubular container that is opposite the eye-piece. The screen is capable of being rotated, in a plane orthogonal to the longitudinal axis of the kaleidoscope, about one or more axes. The screen is also capable of being translated in said plane. The screen is adapted to be written upon erasably with pens, pencils, paint, or the like. The screen is also adapted for adhesively holding translucent or transparent paper for the purpose of writing thereon. The tubular container contains a compartment for storing pens, pencils, and so on. This kaleidoscope allows one to produce symmetrical and beautiful designs from simple drawings and allows the user to cooperate interactively with the kaleidoscope.

15 Claims, 2 Drawing Sheets

INTERACTIVE KALEIDOSCOPE

Field of the Invention

This invention relates to the field of optical toys and amusement devices. More specifically, this invention relates to an interactive kaleidoscope. The objective end of the kaleidoscope contains a translucent or transparent screen in a plane orthogonal to the longitudinal axis of the kaleidoscope, and the screen is adapted to be written upon erasably. Alternatively, paper sheets may be removably adhered to the screen for the purpose of writing upon. Multiple reflections of the drawing in the mirrors produce a symmetrical design that is visible through the eye-piece.

Background of the Invention

A typical kaleidoscope consists of two or more elongated, planar mirrors positioned side-by-side lengthwise of the kaleidoscope. Each pair of mirrors touches at a common edge, and the mirrors in the pair are inclined at a fixed angle with respect to each other. The reflecting surfaces of the mirrors are located on the inner walls of the trough that is formed from each adjacent pair of mirrors. Most common kaleidoscopes contain two mirrors, typically at an angle of 36°, 45°, or 60° with respect to each other, or three mirrors at 60° with respect to each other. Generally the mirrors are housed in a cylindrical tube to which they are fixedly attached. Usually one end of the tube contains an opaque barrier having an opening that serves as an eye-piece, allowing the user to look into the space between the mirrors. The opposite end of the tube, generally called the objective end, usually contains an object box or cell that houses loose, solid objects. The end of the object box that is closest to the eye-piece is usually transparent, and the opposite end is usually translucent. By looking into the eye-piece, the user sees a symmetrical design that results from the objects that are directly viewed plus the multiple reflections of those objects in the mirrors. Rotation of the kaleidoscope causes the objects to tumble about in the object cell, thus giving rise to a potentially infinite number of symmetrical designs.

In other kaleidoscopes, the designs that are produced are not random, but are predetermined in the construction of the instrument. For example, some kaleidoscopes contain one or more translucent or transparent colored wheels mounted at the objective end of the kaleidoscope. Rotation of these wheels, generally about an axis parallel to the longitudinal axis of the kaleidoscope, causes different colors or "objects" to enter the viewing area of the kaleidoscope and thus gives rise to changing designs.

In other kaleidoscopes, the user may play a more active role in determining the ensuing designs by controlling the actual nature, color, and positioning of the objects which form the basis of the symmetrical design. For example, Kaplan, in U.S. Pat. No. 3,020,796, describes how various objects such as tinsel, spangles, thread, etc., may be placed on a horizontal platform and viewed through the eye-piece of a kaleidoscope. The symmetrical design is determined by the nature of the objects and their positioning within the field of view of the kaleidoscope. The design can be altered by rotation of the platform. Dougall, in U.S. Pat. No. 984,198, describes a kaleidoscope wherein the object consists of a translucent flat plate that may be removably connected, by means of a clip, to the objective end of the kaleidoscope. Other kaleidoscopes (for example, that described by Scheufler in U.S. Pat. No. 1,010,808) allow the user an additional degree of control over the nature of the designs by drawing variously colored pictures on a screen; these pictures are then the objects for the kaleidoscope.

SUMMARY OF THE INVENTION

The present invention relates to a kaleidoscope that contains a transparent or translucent screen at the objective end of the kaleidoscope and orthogonal to the longitudinal axis of the kaleidoscope. The screen is attached to the kaleidoscope in a manner such that it is rotatable and translatable, with respect to the mirrors, within the plane of the screen. The user may write directly on the screen using pens or pencils the traces of which are erasable with a cloth or tissue. Alternatively, the user may write upon paper that contains adhesive on one side and attach the paper to the screen. The user can then view, through the eye-piece, the design that is produced through multiple reflections of the drawn picture. The design resulting from a given drawing may be altered by rotationally or translationally moving the screen with respect to the mirrors. The user can observe the gradual increase in complexity of the design as the drawing is successively modified. Moreover, the user does not have to possess artistic talent in order to produce very beautiful and unique designs. In fact, a random scribble can generate very appealing kaleidoscopic patterns.

The device of the present invention is constructed so that all parts of the kaleidoscope, per se, are attached to each other so that individual components will not be lost. It is developed so that no batteries or auxiliary source of illumination or ancillary stand or support are necessary, thus allowing the kaleidoscope to be used at will and to be produced inexpensively. In some embodiments of the invention, a compartment in the tube of the kaleidoscope serves to hold the pencils, pens, or other drawing means and pads of paper.

The present invention is comprised of any conventional type kaleidoscope mirror arrangement, tube, and eye-piece combination in associate with a transparent or translucent screen that is attached to the objective end of the kaleidoscope. The screen is adapted to be written upon with pencils, pens, paint, or other means such that the drawing may be readily erased by wiping with a cloth or tissue (with dampening, if necessary). Alternatively, the user may write on a sheet of paper having an adhesive surface that allows it to bind to the translucent screen. The user may write on the paper prior to or after it is adhered to the screen. The translucency or transparency of the paper allows the drawing to be viewed through the paper as the user looks into the eye-piece of the kaleidoscope.

The screen is attached to the kaleidoscope to prevent its loss by children using this toy. However, the method of attachment is such that the screen is translatable with respect to the mirrors and also rotatable about one or more axes, thus increasing the versatility of the instrument.

No auxiliary source of lighting is required, and no special stand or holding means for the instrument is necessary. A compartment in the tube of the kaleidoscope is used for storing the pens or pencils and also for holding the writing pad. This combination of factors allows the kaleidoscope of the present invention to be used at will in any location.

The kaleidoscope of the present invention is developed so as to be especially useful to young children by making it simple to use and to minimize loss of kaleidoscope components or auxiliary materials.

Using this kaleidoscope, the child can see how very simple drawings can give rise to very beautiful designs. By successively adding to the drawing, the growing complexity of the design can be followed. By use of this instrument, the child can develop a feeling for symmetry. No artistic skill is required to produce very colorful and symmetrical designs, and even a random scribble can result in very pleasant patterns. Movement of the screen relative to the mirrors significantly alters the nature of the designs, further adding to the versatility of the instrument and enhancing its amusement value for children.

The kaleidoscope of the present invention requires a more active involvement by the user than the conventional kaleidoscope having an object box with loose solid particles. In the present kaleidoscope, the user decides on the colors to use and on the nature of the drawings; he or she can see the designs develop step-by-step as he or she adds to the drawing. The effects of straight lines, curved lines, wiggles, etc. can be observed immediately. Cause-and-effect observations add to the play value and educational value of the present kaleidoscope in that the user can see the effect of various actions (e.g., a particular scribble), often with very surprising results. When the adhesive paper is used, a drawing that results in a particularly pleasant or interesting design can be retained for future viewing or for showing to friends.

OBJECTS OF THE INVENTION

In accordance with the above-presented summary of the invention, and a further description of the invention which will follow, it is the primary object of this invention to provide a kaleidoscope containing a translucent or transparent screen at the objective end of the kaleidoscope, said screen being rotatable and translatable in the plane of said screen and being capable of being written upon erasably.

Another object of this invention is to provide a kaleidoscope having a translucent or transparent screen at its objective end, said screen being rotatable about two separate axes that are parallel to the longitudinal axis of the kaleidoscope.

Another object of this invention is to provide a kaleidoscope having a transparent or translucent screen at its objective end and adhesive paper sheets that can be removably attached to said screen.

Still another object of this invention is to provide a kaleidoscope with a compartment for holding pens for writing on a screen that is attached to the objective end of said kaleidoscope.

Another objective of this invention is to provide a kaleidoscope that requires active involvement by the user in an interactive manner and that still is easy to operate.

Another object of this invention is to provide a kaleidoscope that will maintain the continued interest of children and that yet can be produced relatively inexpensively.

Yet another object of the present invention is to provide a kaleidoscope that has educational value in introducing the concept of symmetry and yet does not require any artistic ability on the part of the user to draw pictures that produce very beautiful designs.

These and other objects and advantages of the present invention will become apparent to those skilled in the art upon reading the details of construction and use as more fully set forth below, reference being made to the accompanying drawings forming a part hereof, wherein like numerals refer to like parts throughout.

BRIEF DESCRIPTION OF THE DRAWINGS

FIG. 8 shows a third embodiment of the present kaleidoscope, having a compartment for holding pens, pencils, and the like.

DESCRIPTION OF THE PRESENTLY PREFERRED EMBODIMENTS

Before the present invention is described in detail in terms of its preferred embodiments, it is to be understood that this invention is not limited to the particular arrangements of parts shown, as such devices may, of course, vary. It is also to be understood that the terminology used here is for the purpose of describing particular embodiments only, and it is not intended to be limiting.

Figure 1:
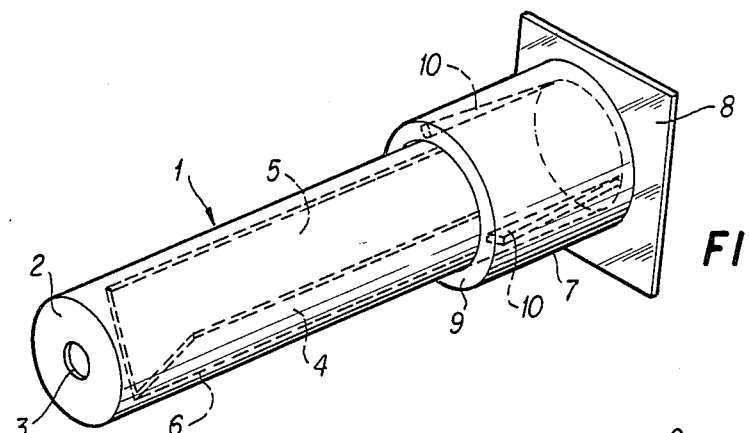
FIG. 1 shows a first embodiment of the kaleidoscope of the present invention.
Figure 2:
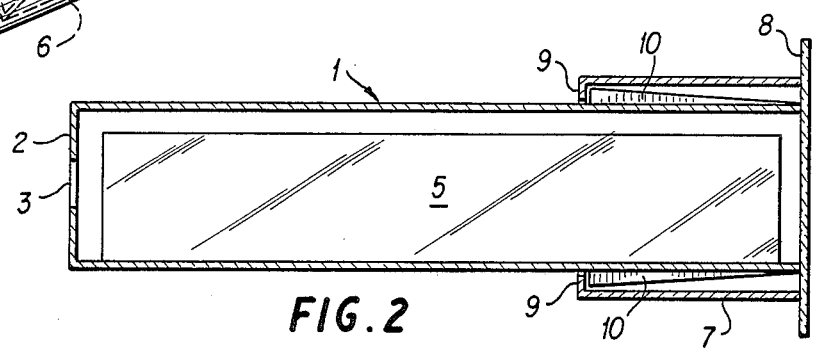
FIG. 2 shows a side-view of the first embodiment.

FIG. 1 and FIG. 2 show one embodiment of the kaleidoscope of the present invention. The tube of the kaleidoscope is designated by the numeral 1. At one end of the tube 1 is an opaque barrier 2 containing an eye-piece 3. Mirrors 4 and 5, which are fixedly attached to the tube 1, lie inside of the tube 1 and are coincident along a common edge 6.

At the opposite end of the tube 1 from the eye-piece 3 is an end-cap 7 that encircles part of the tube 1. Attached to the end-cap 7 is a translucent or transparent screen 8 that is perpendicular to the longitudinal axis of the kaleidoscope. The end of the end-cap 7 that is opposite the screen 8 contains an inwardly pointing lip 9. Numeral 10 designates a camming protrusion on the tube 1 that maintains the end-cap 7 rotatably connected to the tube 1.

The user of the kaleidoscope can write upon the screen 8 with pens or pencils that leave traces that are readily erasable. By looking into the eye-piece 3, the user observes the portion of the drawing that lies in the line of vision from the eye-piece 3, through the trough between the mirrors 4 and 5. In addition, the user sees the numerous reflections in the mirrors 4 and 5 of this portion of the drawing, resulting in a total view that is symmetrical.

The user can easily generate very interesting and beautiful designs by drawing straight lines, curved lines, wiggles, squares, circles, other geometrical patterns, and so on on the screen 8. Alternatively, the user can put such drawings on translucent or transparent paper that has an adhesive surface on one side. The paper is then adhered to the screen 8. The user may draw or paint on the paper before or after it is adhered to the screen 8. In this way, the user can maintain a permanent record of the drawing that is used to generate the symmetrical design.

Rotation of the end-cap 7 about the longitudinal axis of the tube 1 changes the angle of the drawing with respect to the mirrors 4 and 5. Such rotation can dramatically alter the design that the user sees through the eye-piece 3.

Figure 3:
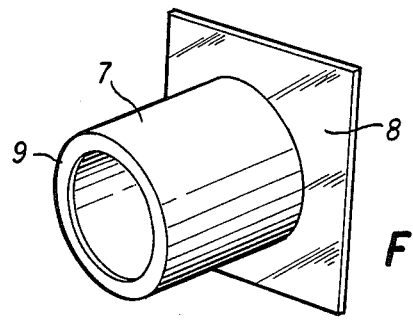
FIG. 3 shows one embodiment of the screen-cum-end-cap of the kaleidoscope.

The screen 8 may be constructed separately from the end-cap 7, and the two components can be subsequently joined together. Alternatively, the screen 8 and the end-cap 7 may be of unitary construction as illustrated in FIG. 3.

Figure 4:
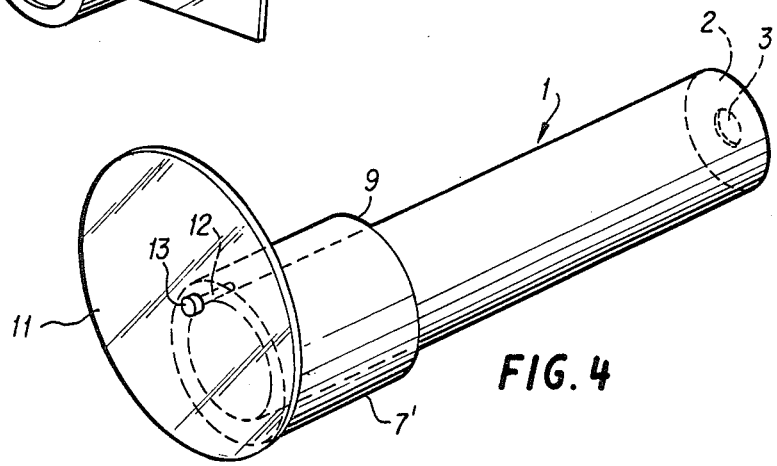
FIG. 4 shows a second embodiment of the present invention.

The versatility of the kaleidoscope of the present invention can be further enhanced by increasing the mobility of the screen 8 with respect to the mirrors 4 and 5. FIG. 4 shows an embodiment of the present invention which allows a screen 11 to rotate about two independent axes, each of which is parallel to the longitudinal axis of the kaleidoscope. In this case, the screen 11 is rotatably attached to the end cap 7' by means of a pin 12 close to the outer rim of the end-cap 7'.

The pin 12 has a head 13 that is greater in diameter than the hole in the screen 11 through which it passes, thus maintaining the screen 11 attached to the kaleidoscope.

The user can draw on the screen 11 or attach paper with a sketch to the screen 11. Rotation of the end-cap 7' with respect to the tube 1 causes the viewed design to change. Rotation of the screen 11 about the pin 12 introduces further variations in the designs. A combination of both types of rotational motions leads to a great variety in the possible designs. In one version of the screen 11, the screen 11 is circular and has a diameter at least approximately twice that of the end-cap 7', and the pin 12 passes through the center of the screen 11.

Figure 5:
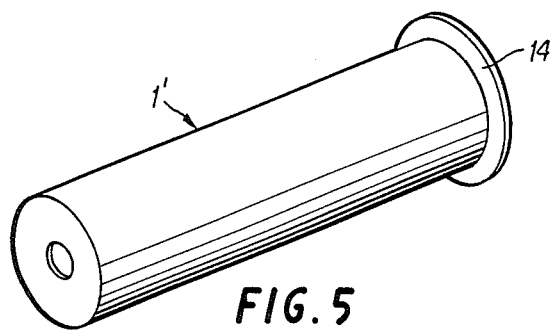
FIG. 5 shows another embodiment of the objective end of the kaleidoscope tube.
Figure 7:
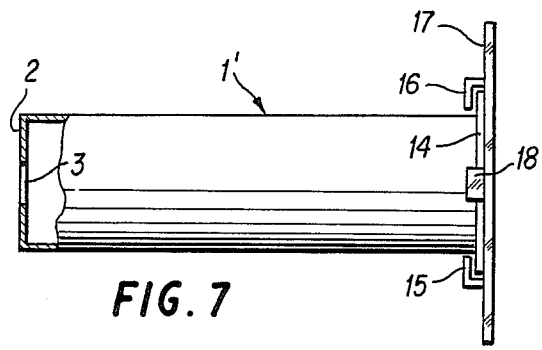
FIG. 7 shows how the kaleidoscope tube from FIG. 5 is used in association with the screen of FIG. 6.
Figure 6:
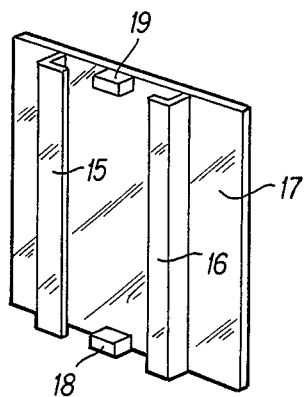
FIG. 6 shows another embodiment of the screen.

In another modification of the present invention, the screen is rotatably and translationally attached to the tube 1. FIGS. 5, 6, and 7 illustrate one way of implementing this combination of rotational and translational motions. Numeral 14 represents an outwardly protruding lip at the objective end of the tube 1'. Numerals 15 and 16 depict inverse L-shaped protruding elements that lie along the surface of a screen 17. The tube 1' is slidably and rotatably attached to the screen 17 by allowing the lip 14 to engage with the elements 15 and 16 as illustrated in FIG. 7. Numerals 18 and 19 represent protrusions on the screen 17 that prevent the tube 1' from separating from the screen 17.

Rotation of the screen 17 generates a variety of designs based on the drawings on the screen 17 or on paper that is adhered to the screen 17. Translation of the screen 17 relative to the tube 1' increases the variety of designs that are possible by introducing new segments of the drawing into the field of view of the kaleidoscope. A combination of the rotational and translational motions dramatically increases the total number of kaleidoscopic designs that are possible from a single sketch.

Other ways of attaching the screen to the tube so that the former is both rotationally and translationally movable with respect to the mirrors are possible. For example, the screen may be slidably connected to an end-cap such as that shown in FIGS. 1 and 2. The slidable connection may be made by means of inverse L-shaped elements that are attached to the end of the end-cap that is furthest from the eye-piece.

Figure 8:
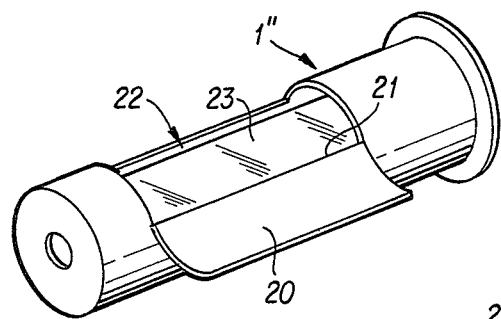

Referring to FIG. 1, of the space within the tube 1, only that region that lies between the mirrors 4 and 5 is functional for the purpose of generating images; the remaining space is essentially redundant. A feature of the present invention is the use of pencils, pens, or other drawing means in association with a kaleidoscope. As this invention is directed primarily at young children, one can advantageously use the above-mentioned redundant space within the tube 1 to store the drawing means when not in use. FIG. 8 shows a kaleidoscope tube 1" having a lid 20 that opens on a hinge 21 to reveal a compartment 22; the inner wall of compartment 22 is comprised of the back 23 of one of the mirrors. Alternatively, the lid 20 may be positioned so that the apex of the angle between two adjacent mirrors is exposed and a greater compartmental space is accessible.

The inventor has found that the use of adhesive paper such as that sold under the trademark Post-It note pads or Post-It note tape to be particularly advantageous when used in association with the kaleidoscope of the present invention. The Post-It products have an adhesive surface on all or part of one side that allows the paper to be adhered to the screen and readily removed again. These paper products are sufficiently translucent to allow the drawing to be viewed through the paper when looking into the eye-piece of the kaleidoscope.

In other modifications of this invention, the screen may be nonplanar and may take various shapes, such as hemispherical, pyramidal, conical, etc., or it may take on the form of a caricature such as the shape of an animal's face.

In the kaleidoscope of the present invention, it is desirable that the screen, with its drawing or adhesive paper attached, remain in a fixed position relative to the mirrors until it is intentionally moved from that position. For that reason, the end-cap 7 in FIGS. 1 and 2 should engage frictionally with the tube 1, the screen 11 in FIG. 4 should engage frictionally with the end-cap 7', and the screen 17 in FIG. 7 should engage frictionally with the lip 14. This frictional resistance to inadvertent motion is in contrast to the desirable free motion of objective wheels on many commercial kaleidoscopes where the purpose is to view the rapidly changing pattern as the wheel is spinning.

Figure 9:
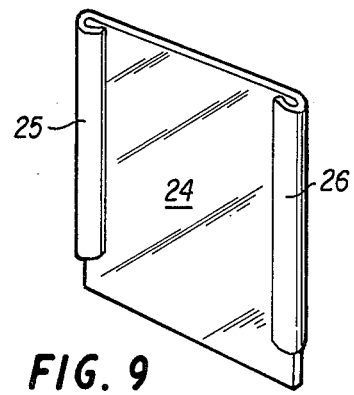

A further embodiment of the screen is illustrated in FIG. 9. In this embodiment, a sheet of paper maybe held to a screen 24 by inserting the sheet of paper between the screen 24 and clips 25 and 26. In this case, the clips 25 and 26 consist simply of narrow strips of material from the screen 24 folded back over the screen 24. Other modifications of clips may also be used.

The instant invention is shown and described in what is considered the most practical and preferred embodiments. It is recognized, however, that departures may be made therefrom, that such departures are within the scope of the invention, and that obvious modifications will occur to one skilled in the art upon reading this disclosure.

What is claimed as new and desired to be secured by Letters Patent of the United States is:

1. A kaleidoscope comprising:
   (a) a tube having a longitudinal axis surrounding at least two mirrors touching at a common edge;
   (b) an eye-piece at the proximal end of said tube;
   (c) a cap rotatably connected to the distal end of said tube for rotation about the longitudinal axis of said tube;

(d) a translucent screen attached to the distal end of said cap, said screen being translatable in a plane orthogonal to the longitudinal axis of said tube; and (e) means for creating designs on said translucent screen.

2. A kaleidoscope as recited in claim 1 wherein said tube surrounds three mirrors.

3. A kaleidoscope as recited in claim 1 or claim 2 wherein said translucent screen is pivotally attached to a point on the circumference of said cap, thereby allowing said translucent screen to rotate relative to said end-cap in a plane orthogonal to the longitudinal axis of said tube.

4. A kaleidoscope as recited in claim 3 wherein said translucent screen is circular and has a diameter at least approximately twice the diameter of said cap.

5. A kaleidoscope as recited in claim 1 or claim 2 wherein said cap and translucent screen are unitary.

6. A kaleidoscope as recited in claim 1 or claim 2 and further comprising a lid on the side of said tube, said lid opening into a compartment for holding pencils, pens, and the like.

7. A kaleidoscope as recited in claims 1 or 2 wherein said translucent screen is nonplanar.

8. A kaleidoscope as recited in claims 1 or 2 wherein said means comprise a plurality of translucent paper sheets having an adhesive on one surface thereof.

9. A kaleidoscope as in claim 1 wherein relative movement between said translucent screen and said cap is frictionally hindered, thus causing said translucent screen to remain in the position relative to said mirrors that it is set by the user until the user intentionally causes movement between said translucent screen and said cap.

10. A kaleidoscope as in claim 3 wherein relative movement between said translucent screen and said cap is frictionally hindered, thus causing said translucent screen to remain in the position relative to said mirrors that it is set by the user until the user intentionally causes movement between said translucent screen and said cap.

11. A kaleidoscope as in claim 4 wherein relative movement between said translucent screen and said cap is frictionally hindered, thus causing said translucent screen to remain in the position relative to said mirrors that it is set by the user until the user intentionally causes movement between said translucent screen and said cap.

12. A kaleidoscope as recited in claims 1 or 2 and further comprising a clip allowing paper sheets to be clipped onto said translucent screen.

13. A kaleidoscope as recited in claim 1 wherein:

(a) a plurality of protrusions are formed on the outer circumference of said tube at the distal end of said tube;

(b) an inwardly projecting lip is formed at the proximal end of said cap; and (c) said cap is held onto said tube by interference between said plurality of protrusions on said tube and said inwardly projecting lip on said cap.

14. A kaleidoscope as recited in claim 13 wherein:

(a) each one of said plurality of protrusions has a radially outward camming surface that increases in radial height from the distal end of said tube toward the proximal end of said tube; and (b) said cap is releasably mounted on said tube by camming said inwardly projecting lip outwardly as it passes over said plurality of protrusions.

15. A kaleidoscope as recited in claims 1 or 2 wherein said translucent screen can be written on while the kaleidoscope is being used.

* * * * *